United States Patent
Harper

(10) Patent No.: US 6,491,855 B1
(45) Date of Patent: Dec. 10, 2002

(54) MOULDING TOOLING

(76) Inventor: Alan Roger Harper, Plastech Thermoset Tectonics, Unit One Delaware Road, Gunnislake, Cornwall PL18 9AR (GB)

( * ) Notice: Subject to any disclaimer, the term of this patent is extended or adjusted under 35 U.S.C. 154(b) by 0 days.

(21) Appl. No.: 09/636,540

(22) Filed: Aug. 10, 2000

(30) Foreign Application Priority Data

Jun. 6, 2000 (GB) .............................................. 0013691

(51) Int. Cl.$^7$ ............................................... B29C 33/38
(52) U.S. Cl. ........................ 264/227; 264/219; 264/511
(58) Field of Search ................................ 264/227, 219, 264/511

(56) References Cited

U.S. PATENT DOCUMENTS

| | | | | |
|---|---|---|---|---|
| 1,986,637 A | * | 1/1935 | Hollier | 264/227 |
| 3,446,885 A | * | 5/1969 | Krauss | 264/227 |
| 3,520,967 A | * | 7/1970 | Kreier, Jr. | 264/227 |
| 3,548,050 A | * | 12/1970 | Mozer | 264/227 |
| 3,562,049 A | * | 2/1971 | Maher | 264/227 |
| 4,860,815 A | * | 8/1989 | Parker et al. | 264/227 |
| 5,298,213 A | * | 3/1994 | Shyu | 264/227 |

FOREIGN PATENT DOCUMENTS

| | | | | |
|---|---|---|---|---|
| JP | 59-24619 | * | 2/1984 | 264/227 |

* cited by examiner

*Primary Examiner*—Allan R. Kuhns
(74) *Attorney, Agent, or Firm*—Davis & Bujold, P.L.L.C.

(57) ABSTRACT

A method of making tooling by preparing a master model having a first surface and casting a thin-skinned mold from a first master surface, with an inner surface corresponding to the first master surface and an outer surface spaced from the inner surface thereof. A bolster is fabricated in releasable contact with the outer surface of the thin-skinned mold and serves as a support structure for the thin-skinned mold or a replica thereof. The bolster and thin-skinned mold are removed from the master and the thin-skinned mold supported by the bolster in contact with the outer surface thereof. A thickness calibration material is located on the inner surface of the thin-skinned mold and corresponds in thickness to an article to be produced. A matching contra halfmold set is formed against the calibration material, the calibration material and thin-skinned mold being supported by the bolster. The contra half matching mold set is removed, and the calibration material removed from the inner surface of the thin-skinned mold. The bolster and the thin-skinned mold are aligned with the matching mold set contra half to define a cavity corresponding to the calibration material, and the surfaces of the cavity coated with a release agent. A rigid skin member is cast in the cavity, the matching mold set contra half removed from registration with the bolster and the thin-skinned mold, and the thin skinned mold removed from the bolster.

9 Claims, 2 Drawing Sheets

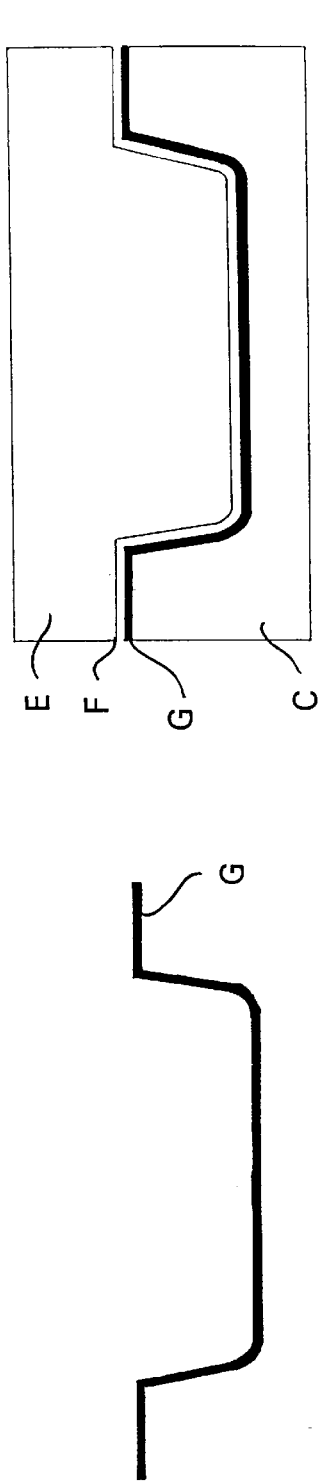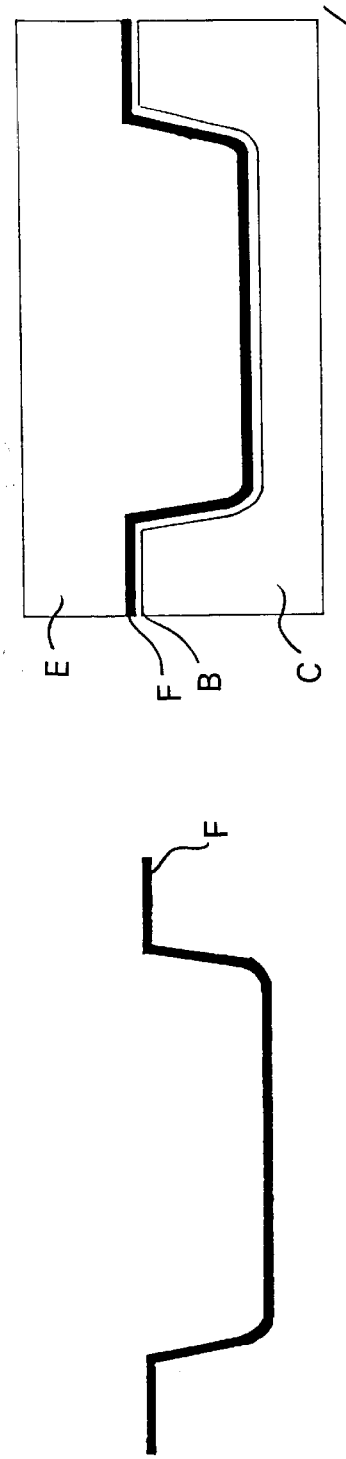
Fig. 2A
Fig. 2B

MOULDING TOOLING

A composite mold can make use of a metal faced mold. The metal can be deposited as a skin such as by metal spraying, sheet forming, casting or machining. Whatever means are used to provide a skin the metal thickness is kept to a minimum and the skin is cradled in a well support composite material including an embedded heater. It is supported as a skin adapted for high temperature operation by way of steel support frames serving to provide for readily matchable mold sets.

As originally conceived solid bonding of the skin to the supporting frame reduced, if it did not actually prevent, allowance for movement between skin and frame to provide. This is desirable in order to allow for a degree of relative movement between skin and frame arising from differential expansion due to different coefficients of thermal expansion between frame and skin.

In our co-pending UK Application No. 9623587.49 (the "Application") there is described a process for the manufacture of tooling comprising the use of a thin skin mold supported in a bolster by way of an elastomeric shim over the entire under surface of the skin, the shim being, in turn, supported on an in-fill in the bolster wherein the thin skin is of at least one of the following: vacuum formed thermoplastic sheet; formed metal sheet; cast metal skin; ceramic skin; silicone or similar elastomeric matrix skin; thermoset reinforced or un-reinforced skin.

The application further describes a process for the manufacture of tooling characterized by the steps of: forming on a surface of a master pattern member a skin layer by casting or laminating of plastics material; the skin layer during this stage having an inner face contacting the member and an exposed outer face; depositing on the exposed face of the skin layer a calibration layer of substantially uniform thickness of a material such as wax; the calibration layer during this step having an inner face contacting the sin and an exposed outerface; depositing on the exposed face of the calibration layer a bolster layer of a heat insulating material optionally including means whereby the bolster layer can be heated or cooled or providing for both heating and cooling relative to ambient temperature; shrouding the exposed face of the bolster layer by way of a bolster frame so as to provide between the exposed face of the bolster layer and an inner face of the bolster frame a plenum; filling the plenum with an aggregate material providing for thermal insulation between the bolster layer and the bolster frame; separating the pattern with the skin layer retained thereon from the assembled bolster frame, bolster layer and calibration layer; removing the calibration layer to expose the inner face of the bolster layer; provide a release means on the exposed inner surface of the bolster layer; relocate the pattern with the skin layer retained thereon into the assembled bolster frame and bolster layer; injecting or otherwise locating in the volume left on removal of the calibration layer between the exposed face of the skin layer and the exposed inner surface of the bolster layer a plastics material to provide a locking shim reproducing the exposed face of the skin layer; and operating the pattern from the remainder of the assembly when formation of the locking shim is complete; removing the release means from the bolster layer; locating the skin on the locking shim in the bolster to provide a tool comprising the skin layer releaseably mounted on the bolster layer by way of the locking shim and the bolster layer retained in the bolster frame.

According to a first aspect of the present invention there is provided a method of making tooling comprising the following steps of preparing a master model having a first surface; casting a thin-skinned mold from the first surface of the master model, the thin-skinned mold having an inner surface corresponding to the first surface of the master model and an outer surface spaced from the inner surface thereof; fabricating a bolster in contact with, and releasable from, the outer surface of the thin-skinned mold, which bolster is intended to serve as a support structure for either the thin-skinned mold or a replica thereof; removing the bolster and the thin-skinned mold from the master model and thereafter supporting the thin-skinned mold by means of the bolster, the bolster being in contact with the outer surface of the thin-skinned mold; locating a layer of a thickness calibration material on the inner surface of the thin-skinned mold, the layer corresponding in thickness to an article to be produced by means of the tooling; forming a matching mold set contra half against the layer of calibration material while the calibration material and the thin-skinned mold are supported by the bolster; removing the matching mold set contra half from the combination of the calibration material, the thin-skinned mold and the bolster and thereafter removing the calibration material from the inner surface of the thin-skinned mold; aligning the combination of the bolster and the thin-skinned mold with the matching mold set contra half to define a cavity corresponding to the space previously occupied by the calibration material; coating the surfaces defining the cavity with a release agent and thereafter casting a rigid skin member in the cavity; removing the matching mold set contra half from registration with the combination of the bolster and the thin-skinned mold, and removing the thin-skinned mold from the bolster.

According to a first preferred version of the first aspect of the present invention wherein the provision of a replica of the first female thin skinned mold characterized by the steps of: registering the bolster and rigid skin combination with the mold set contra half to define a cavity defining a mold for a replica of the first female thin skinned mold; and casting a replica in the mold.

According to a second preferred version of the first aspect of the present invention at least one casting process can be selected from a group comprising pouring liquid matrix, injecting a liquid matrix under pressure, injecting a liquid matrix using sub atmospheric pressure; injecting a liquid matrix using both super and sub-atmospheric pressures.

According to a third preferred version of the first aspect of the present invention or any preceding preferred version thereof the bolster and thin skin combination and the mold set contra half provide for heating of a surface to be contracted by material to be cast.

According to a fourth preferred version of the first aspect of the present invention or any preceding preferred version thereof there is provided a step for a surface to be contacted by material for casting of coating with a material selected from a group comprising metal, alloy, ceramic, elastomeric, un-reinforced or reinforced thermoset resin. Typically where a metal coating is to be used the surface is coated by a spraying process. Alternatively the surface is formed by a metal sheet of reduced thickness by comparison with the desired final thin skin and the required thickness is achieved by a layer of a castable matrix attached to the rear side of formed metal sheet.

According to a fifth preferred version of the first aspect of the present invention or any preceding preferred version thereof the step of fabricating the bolster involves a computer numerically controlled machining operation to provide for the subsequent mounting of the item on the bolster.

According to a sixth preferred version of the first aspect of the present invention or any preceding preferred version thereof the item is retained on the bolster by means of a sub-atmospheric pressure.

According to a second aspect of the present invention there is provided a mold tool manufactured according to the method of the first aspect or of any preferred version thereof.

According to a third aspect of the present invention there is provided a product manufactured by means of a mold tool according to the third aspect.

Exemplary embodiments of the new invention will now be broadly described including reference to the accompanying drawings which show steps in a process for manufacturing skins for use in mold sets.

BRIEF DESCRIPTION OF THE DRAWINGS

FIG. 2A illustrates the polishing and repositioning of a skin to obtain an enhanced moldable surface; and, FIG. 2B illustrates the casting of model production parts.

FIG. 1A

Figure 1A:
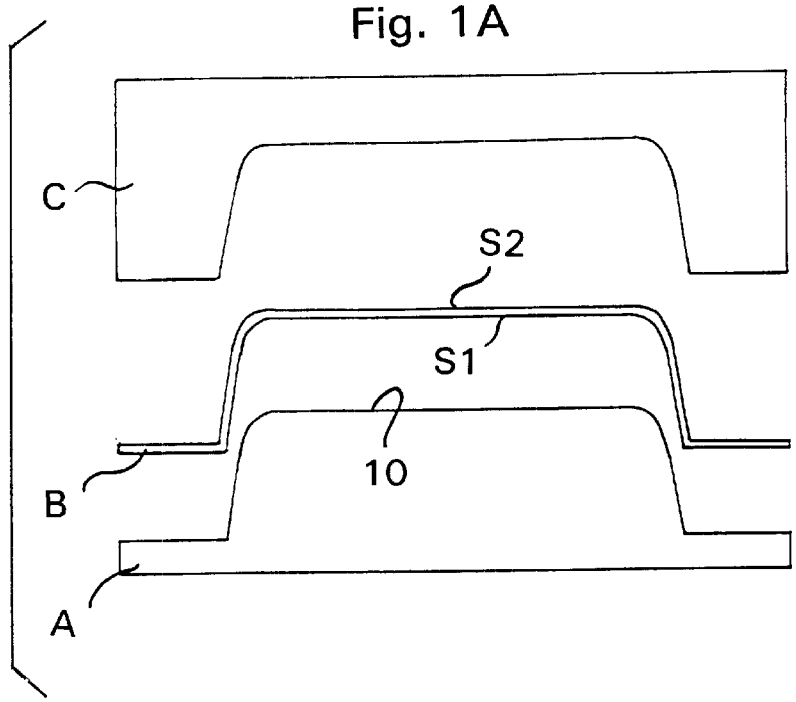
FIG. 1A illustrates the making of a female thin skin mold and a thin skin mold support from a male mold model.
Figure 1B:
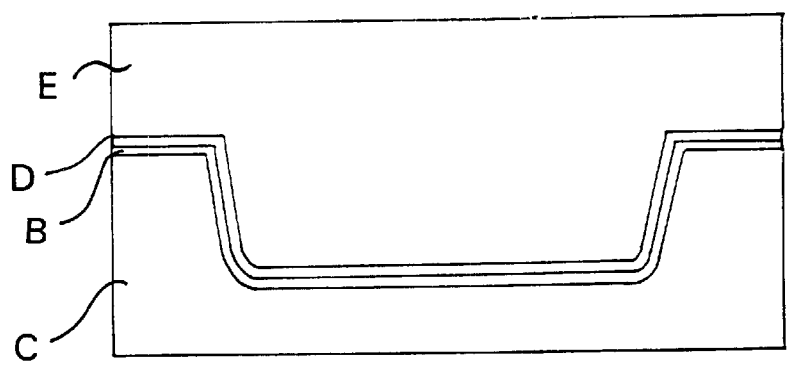
FIG. 1B illustrates the assembly of a calibration thickness, the female thin skin mold and matching mold set.
Figure 1C:
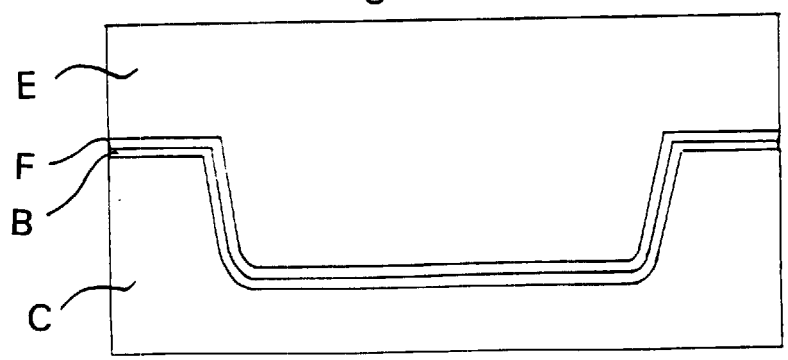
FIG. 1C illustrates the casing of a rigid skin in a cavity resulting from removal of a skin.

1) A=Normal male model (pattern or master model).
B=First female "thin skin" mold cast from A surface.
C=Production thin skin mold support structure (bolster which can including means for surface heating) cast from surface "S2" while B remains accurately supported on A.

FIG. 1B

2) D=Thickness calibration material placed against skin B "S1" surface while skin B is accurately supported in bolster C.
3) E=Matching mold set contra half cast against skin upper surface of D.
4) Thickness calibration material is "D" now removed after E is opened from C and B.

FIG. 1C

5) A rigid skin "F" is now cast in the cavity left by the D skin removal and represents an exact replication of D. This is carried out when C, E and B are held together in original registration with one another.

FIG. 2A

6) The F1 "good" face of F can be enhanced with polishing before repositioned against E to achieve an enhanced moldable surface of F which then becomes a molded replica surface of original A master model surface.
7) To manufacture replica copies of "thin skin" mold B, rigid skin F is held in accurate registration with E and both are brought accurately together with form cavity G which, in turn, enables replica "Thin Skin" mold G to be cast. This stage 6 above can be repeated time and time again to manufacture further replicas of original "thin skin" B mold.
8) The above procedures improve the manufacture efficiency of multiple mold faces for production molds.

FIG. 2B

9) Mold set comprising C, E and B are used to cast further molded production parts F. Likewise mold set comprising C, E and G can be used to cast further molded production parts F.

The present improved invention procedural description relates to casting replica multiple mold faces for a closed mold system and is normally, but not exclusively, applicable to composite molds whether equipped with an internal temperature control system or not.

The procedures can readily b applied to metal, ceramic, elastomeric or other suitable mold face materials and are not limited to composite materials, such as thermoset resins whether unreinforced or reinforce.

The outline of the present invention of casting referred to above with reference to the figures is in general term and implies a method of manufacture which could be used in its simplest form of pouring a setting liquid matrix to a system using injecting of the matrix under a pressure different whether sub- or super-atmospheric pressure or a combination of both.

The method of "thin skin" mold manufacture described provides for a metal spray coat or cold formed metal sheet of less thickness dimension than final "thin skin" dimension which is subsequently filled on its S2 surface with a castable matrix to ensure replication and thus accurate fit to production bolster (support) "C".

The proposed method provides for the manufacture of production bolster C with a contour fit for thin skins is CNC machined from predictable data factored from original model shape (surface) data.

A method of manufacture of first and subsequent thin skins production bolster manufacture as outline in proceeding method 13 above where by this is manufactured prior to original casting manufacture of the first "thin skin" mold face. The original "thin skin" mold face (first) is, therefore, cast between the formed CNC surface and original model surface when brought together in registration.

A method of accurately holding the "thin skin" replica mold skin in registration within the product bolster by way of sub-atmospheric pressure being sealed and extensively applied to the S2 and matching surface of support bolster B as outlined in the existing patent application referred to earlier.

Shim D can be a flexible and accurate self adhesive shimming material, i.e. calibration sheet wax of sheet cork.

The present invention provides for low cost tooling or mold construction by considering the possibility arising from skin tooling rather than depending on existing solid conventional tooling build concepts.

Other features of the invention contrasting with existing processes include: the provision of a process providing for reduction in mold material cost; reduction in mold building labor cost; faster mold production; maintenance of high equality mold part surface due to thin skin homogeneity.

The process also provides for a user of the process and molds and tools produced by it in contrast to existing system to provide for: quicker first off molding; multiple tooling faces without normal multiple costs; mold face renewal at low cost; less tooling capital outlay; higher production volumes with little or no increased capital expenditure; greater capitalization of tooling investment; and low cost skin renewal.

What is claimed is:

1. A method of making tooling comprising the following steps:
   a) preparing a master model having a first surface;
   b) casting a thin-skinned mold from the first surface of the master model, the thin-skinned mold having an inner surface corresponding to the first surface of the master model and an outer surface spaced from the inner surface thereof;

c) fabricating a bolster in contact with, and releasable from, the outer surface of the thin-skinned mold, which bolster is intended to serve as a support structure for either the thin-skinned mold or a replica thereof;

d) removing the bolster and the thin-skinned mold from the master model and thereafter supporting the thin-skinned mold by means of the bolster, the bolster being in contact with the outer surface of the thin-skinned mold;

e) locating a layer of a thickness calibration material on the inner surface of the thin-skinned mold, the layer corresponding in thickness to an article to be produced by means of the tooling;

f) forming a matching mold set contra half against the layer of calibration material while the calibration material and the thin-skinned mold are supported by the bolster;

g) removing the matching mold set contra half from the combination of the calibration material, the thin-skinned mold and the bolster and thereafter removing the calibration material from the inner surface of the thin-skinned mold;

h) aligning the combination of the bolster and the thin-skinned mold with the matching mold set contra half to define a cavity corresponding to the space previously occupied by the calibration material;

i) coating the surfaces defining the cavity with a release agent and thereafter casting a rigid skin member in the cavity;

j) removing the matching mold set contra half from registration with the combination of the bolster and the thin-skinned mold, and k) removing the thin-skinned mold from the bolster.

2. The method according to claim 1, in which the rigid skin member is then placed on the mold set contra half, in register therewith, to provide a molded replica of the first surface of the master model.

3. The method according to claim 2, in which a replica of the first thin-skinned mold is produced by:

registering the combination of the bolster and the rigid skin member with the mold set contra half to define a cavity which acts as a mold for a replica of the first thin-skinned mold; and casting the replica in the thus-defined cavity.

4. The method according to claim 1, in which the step of fabricating the bolster involves a computer numerically controlled machining operation to provide for the subsequent mounting of the thin-skinned mold thereon.

5. The method according to claim 3, in which the step of fabricating the bolster involves a computer numerically controlled machining operation to provide for the subsequent mounting of the thin-skinned replica thereon.

6. The method according to claim 1, in which the thin-skinned mold is retained on the bolster by the application of a sub-atmospheric pressure.

7. The method according to claim 3, in which the replica is retained on the bolster by the application of a sub-atmospheric pressure.

8. The method according to claim 1, in which the thin-skinned mold is formed by casting.

9. The method according to claim 1, in which the matching mold set contra half is formed by casting.

* * * * *